S. D. POOLE.
HARROW AND CULTIVATOR.
APPLICATION FILED MAY 1, 1907.
1,138,971. Patented May 11, 1915.
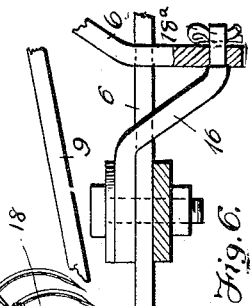
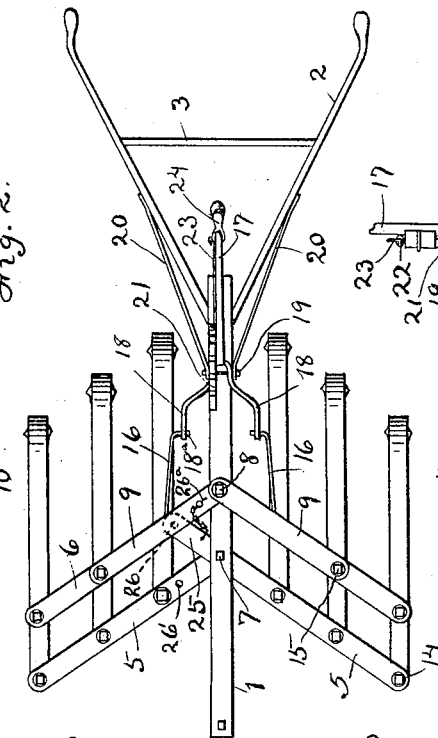
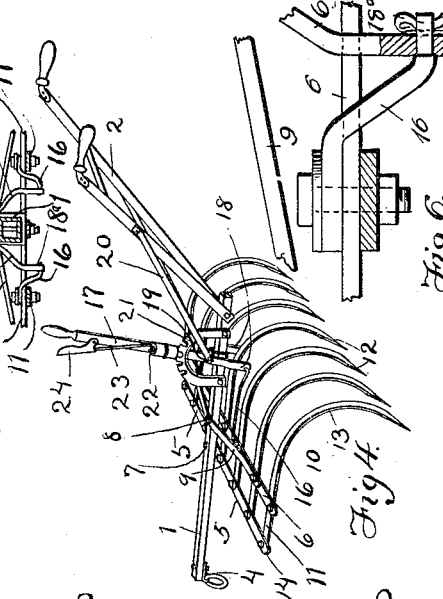
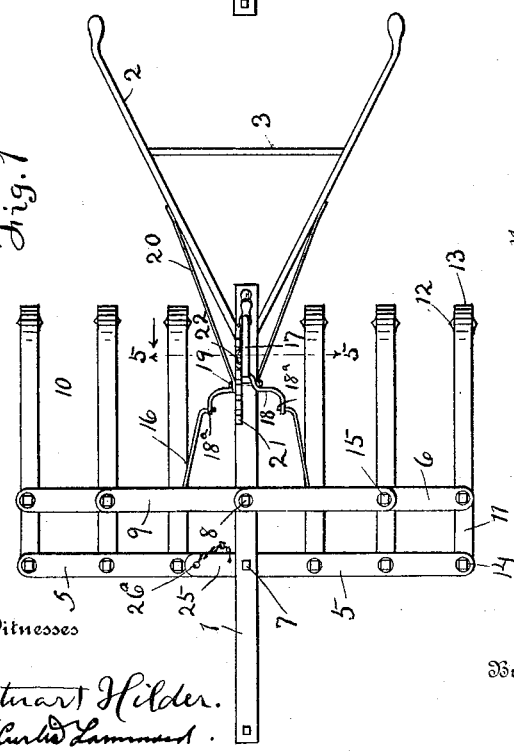
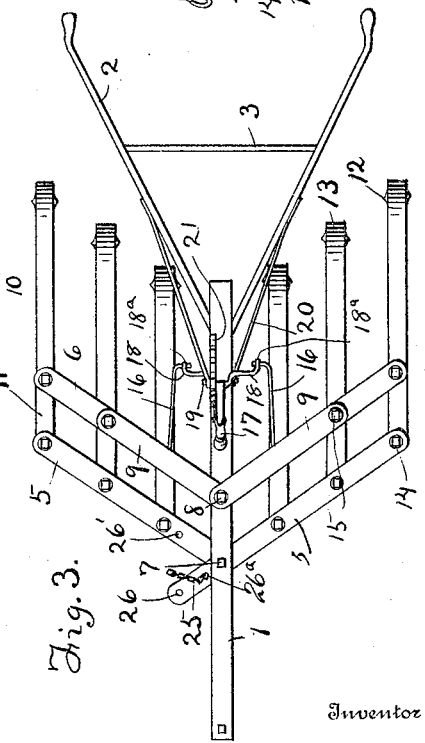

UNITED STATES PATENT OFFICE.

STALEY D. POOLE, OF MOLINE, ILLINOIS, ASSIGNOR TO DEERE & COMPANY, OF MOLINE, ILLINOIS, A CORPORATION OF ILLINOIS.

HARROW AND CULTIVATOR.

1,138,971.  Specification of Letters Patent.  Patented May 11, 1915.

Application filed May 1, 1907.  Serial No. 371,347.

*To all whom it may concern:*

Be it known that I, STALEY D. POOLE, a citizen of the United States, residing at Moline, in the county of Rock Island and State of Illinois, have invented certain new and useful Improvements in Harrows and Cultivators, of which the following is a specification, reference being had therein to the accompanying drawing.

This invention relates to implements of the class of cultivators and harrows wherein use is made of spring teeth, and particularly to the implements in that class which have the spring teeth and the parts which immediately support them so arranged that they may be adjusted or set to any one of a number of positions according to the work which is to be performed.

Figure 1 is a plan view of an implement embodying the improvements. Fig. 2 shows the same when the parts are adjusted to have the outer ends of the tooth supporting device relatively forward. Fig. 3 shows it when the parts are so adjusted that the outer ends of the tooth supports extend relatively backward. Fig. 4 is a perspective of the tool. Fig. 5 is a sectional view taken on the line 5, 5, Fig. 1. Fig. 6 is an enlarged fragmentary plan view, partly in section, showing in detail a part of the connection between one of the hand levers and the swinging frame bars.

In the drawings a centrally disposed beam is indicated at 1. It may be made in any suitable way of any desired material. As shown it is formed of metal tubular in cross section. At the rear end it is provided with handles 2 with one or more braces as at 3; and the draft devices are attached at 4.

Laterally from the beam there extends to the right a pair of parallel bars 5, 6, and to the left there extends a similar pair of bars. The bars 5, 5 are pivoted at their ends to the underside of the beam as shown at 7. The bars 6, 6 are similarly pivoted by a bolt or pin at 8. On each side of the beam the bars 5, 6 are preferably substantially parallel to each other at all times.

9 indicates swinging brace bars which have their inner ends pivoted at 8 to the top of the beam and have their outer ends pivotally connected to the outer bars 6.

The cultivating devices illustrated consist of the curved tooth bars 10, 10. Each of these has an approximately straight part at 11, a hoe or active end part 12, and a curved elastic connecting part at 13. The straight sections 11 of these teeth 10 are each pivoted to a bar 5 and a bar 6, the pivoted sections 11 being substantially parallel to each other across the implement.

It will be seen that the bars 5, 5 and the sections 11 of the teeth which are pivotally connected thereto constitute a "parallel rule" structure there being one on each side of the beam. This parallel bar device can be swung forward at its outer end or rearward, and this will widen or narrow the total dimension laterally of the implement. In whatever position the teeth are thrown by this movement of the frame they will be maintained in parallelism in relation to each other and each in relation to its several positions.

One of the purposes of this invention is to provide a simple easily manipulated instrumentality for effecting the adjustment of the toothed bars and for holding them after adjustment.

16, 16 indicate links, one on each side of the beam, and pivotally connected to the rear tooth bars 6 respectively. A single lever 17 is combined with these, this lever being forked at its lower end as shown at 18, each leg of the fork being connected to one of the links 16. The lever is pivoted at 19 to the beam or to a bracket or standard secured thereto, and in order to hold the lever fulcrum rigidly in position I employ braces which are shown at 20 which extend up to suitable points on the handles 2.

21 is a ratchet lock segment secured to the beam and arranged close to the lever.

22 is a detent carried by the lever 17 and adapted to engage with the ratchet segment 21, this detent having a link 23, and a thumb latch piece 24, pivoted to the lever near its upper end.

It will be seen that the operator has the position of the gangs directly under control, by a simple device through which power of the utmost economy can be readily applied so that he can throw the parts into any desired position.

The inner end of one of the bars 5 is extended beyond the pivot 7 as represented at 25, and is perforated near its end at 26. When the two forward bars 5 are on opposite sides of the beam and are brought in line with each other as indicated in Fig. 1, a bolt 26ª may be passed through the aperture 26 and a corresponding registering aperture 26' in the other bar, thus uniting them and causing the two bars to act as one piece rigid from end to end. This connection of these bars is made when the harrow or cultivator is to be converted into what is known as a side harrow. When this is done one of the links 16 is detached from the corresponding lever 18, the cotter pin 18ª being first removed. Then the adjusting of the bars, which must now under all conditions remain parallel from end to end entirely across the machine, is effected through the connection of the operating lever and the parallel bars 6, 6 by a single link 16.

What I claim is:

1. In a cultivator, the combination of a beam, two groups of normally separately swinging parallel flat horizontal bars vertically pivoted to the beam and positioned on opposite sides thereof, longitudinally extending flat tool bars each pivotally connected to the several bars of one of the groups of swinging bars and each bent downward at its rear end to form a resiliently ground engaging tool, separately swinging brace bars for the said groups of swinging bars, each brace bar being at its outer end connected to one of the swinging bars and at its inner end vertically pivoted to the beam co-axially with the corresponding swinging bar and in a different horizontal plane therefrom, and means for holding the swinging bars in definite angular relation to the beam.

2. In a cultivator, the combination of a beam, two groups of swinging bars arranged on opposite sides of the beam and vertically pivoted thereto for movement about common axes, the bars of each group being parallel to each other, longitudinal tool bars arranged in sets on opposite sides of the beam and each vertically pivoted to each of the corresponding swinging parallel bars, tools located at the rear ends of the longitudinal bars and adapted to be arranged by the adjustment of the bars in a single straight line or in two lines diverging from the center toward the front or in two lines diverging from the center toward the rear, means for locking together for unitary movement above the common axis two oppositely disposed swinging bars the tools being thus held in one straight line, a pivoted hand lever on the beam, and means for connecting the hand lever either with the bars at both sides of the beam whereby the hand lever may be used to bring the tools into any one of the three aforesaid relationships or with the bars at only one side of the beam whereby the hand lever may be used (when the aforesaid locking means is operative) to change the angle of the line of the tools with respect to the beam.

In testimony whereof I affix my signature, in presence of two witnesses.

STALEY D. POOLE.

Witnesses:
  CHAS. H. POPE,
  J. E. POOLE.

Copies of this patent may be obtained for five cents each, by addressing the "Commissioner of Patents, Washington, D. C."

Correction in Letters Patent No. 1,138,971.

It is hereby certified that in Letters Patent No. 1,138,971, granted May 11, 1915, upon the application of Staley D. Poole, of Moline, Illinois, for an improvement in "Harrows and Cultivators," an error appears in the printed specification requiring correction as follows: Page 2, line 56, for the word "above" read *about;* and that the said Letters Patent should be read with this correction therein that the same may conform to the record of the case in the Patent Office.

Signed and sealed this 6th day of July, A. D., 1915.

[SEAL.]

R. F. WHITEHEAD,
*Acting Commissioner of Patents.*